(12) United States Patent
Verger et al.

(10) Patent No.: US 7,581,766 B2
(45) Date of Patent: Sep. 1, 2009

(54) REINFORCED TUBULAR JOINT FOR IMPROVED SEALING-TIGHTNESS AFTER PLASTIC EXPANSION

(75) Inventors: Eric Verger, Gommegnies (FR); Albert Bruneau, Boulogne Billancourt (FR); Antoine Durand, Valenciennes (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 54 days.

(21) Appl. No.: 10/496,008

(22) PCT Filed: Jun. 11, 2003

(86) PCT No.: PCT/FR03/01744

§ 371 (c)(1),
(2), (4) Date: Dec. 16, 2004

(87) PCT Pub. No.: WO2004/003416

PCT Pub. Date: Jan. 8, 2004

(65) Prior Publication Data

US 2005/0087983 A1    Apr. 28, 2005

(30) Foreign Application Priority Data

Jun. 28, 2002    (FR) ................................. 02 08080

(51) Int. Cl.
*F16L 13/14*    (2006.01)
*F16L 25/00*    (2006.01)

(52) U.S. Cl. ..................... 285/382.2; 285/333; 285/334; 285/382.4

(58) Field of Classification Search ................. 29/456, 29/522.1, 523; 285/334, 333, 391, 382.1, 285/382.2, 382.4, 382.5, 382.7; 166/207, 166/242.6

See application file for complete search history.

(56) References Cited

U.S. PATENT DOCUMENTS 418,752 A  *  1/1890  Rogers ..................... 285/381.1
733,346 A  *  7/1903  Tallerday .................... 285/403

(Continued)

FOREIGN PATENT DOCUMENTS

WO      WO 00/08301        2/2000

(Continued)

*Primary Examiner*—James M. Hewitt
*Assistant Examiner*—Jay R Ripley
(74) *Attorney, Agent, or Firm*—Panitch Schwarze Belisario & Nadel LLP (57) ABSTRACT

The invention relates to a high-performance threaded tubular joint comprising a first, male tubular element (11) and a second, female tubular element (12) made up together by screwing. One of the tubular elements (11; 12) has a non-threaded lip (38; 5) extending between its thread and its free end and having a sealing surface (40; 7) in sealing-tight contact with the opposite surface (41; 8) of the other element after screwing together, diametric expansion, and then generation of springback forces of the first and second tubular elements. The joint has a tubular sleeve (34; 36) threaded over the second element (12) before screwing together and positioned to extend axially substantially opposite to the lip (3; 5) and, after diametric expansion, generating a springback force which is added to that of the second element in order to counteract the springback force of the first element, thus effecting at least the shrink-fitting of the tubular sleeve over the second element.

20 Claims, 4 Drawing Sheets

U.S. PATENT DOCUMENTS

| | | | |
|---|---|---|---|
| 1,942,518 A * | 1/1934 | Protin | 285/115 |
| 2,546,295 A | 3/1951 | Boice | |
| 2,592,854 A | 4/1952 | Boice | |
| 2,978,263 A * | 4/1961 | Walsh et al. | 285/256 |
| 3,015,500 A | 1/1962 | Barnett | |
| 3,191,677 A * | 6/1965 | Kinley | 166/277 |
| 3,545,794 A * | 12/1970 | Wise et al. | 285/248 |
| 3,674,292 A * | 7/1972 | Demler, Sr. | 285/148.18 |
| 3,942,824 A | 3/1976 | Sable | |
| 4,611,838 A * | 9/1986 | Heilmann et al. | 285/331 |
| 5,014,779 A * | 5/1991 | Meling et al. | 166/55.7 |
| 5,015,014 A * | 5/1991 | Sweeney | 285/81 |
| 5,348,095 A * | 9/1994 | Worrall et al. | 166/380 |
| 5,582,439 A * | 12/1996 | Spears | 285/333 |
| 5,769,466 A | 6/1998 | Noel et al. | |
| 5,971,443 A | 10/1999 | Noel et al. | |
| 6,047,997 A * | 4/2000 | Olivier | 285/333 |
| 6,305,723 B1 * | 10/2001 | Schutz et al. | 285/333 |
| 6,312,024 B1 | 11/2001 | Dutilleul et al. | |
| 6,345,431 B1 * | 2/2002 | Greig | 29/506 |
| 6,409,175 B1 | 6/2002 | Evans et al. | |
| 6,554,287 B1 | 4/2003 | Sivley, IV et al. | |
| 6,564,875 B1 * | 5/2003 | Bullock | 166/382 |
| 6,712,401 B2 | 3/2004 | Coulon et al. | |
| 2002/0163192 A1 * | 11/2002 | Coulon et al. | 285/331 |
| 2003/0107213 A1 * | 6/2003 | Baugh et al. | 285/92 |
| 2005/0015963 A1 * | 1/2005 | Costa et al. | 29/523 |

FOREIGN PATENT DOCUMENTS

| | | |
|---|---|---|
| WO | 02/01102 | 1/2002 |
| WO | WO 03/059549 A1 | 7/2003 |
| WO | WO 03/060369 A1 | 7/2003 |
| WO | WO 03/060370 A1 | 7/2003 |
| WO | WO 03/086675 A2 | 10/2003 |
| WO | WO 03/089161 A2 | 10/2003 |
| WO | WO 2004/009950 A1 | 1/2004 |
| WO | WO 2004/010039 A2 | 1/2004 |
| WO | WO 2004/023014 A2 | 3/2004 |
| WO | WO 2004/027786 A2 | 4/2004 |
| WO | WO 2004/074622 A2 | 9/2004 |

* cited by examiner

REINFORCED TUBULAR JOINT FOR IMPROVED SEALING-TIGHTNESS AFTER PLASTIC EXPANSION

The invention relates to a tubular joint, in particular of the type used for hydrocarbon wells or similar wells, e.g. in the field of geothermics.

Such a joint may exist between two great-length tubes or between a great-length tube and a coupling. These joints are used in particular for assembling strings of casings or tubings. Taking into account the mechanical features required, the casings and tubings are generally made of heat-treated steel.

For their part, the joints must withstand tension, compression, bending and sometimes twisting as well as widely differing pressure in both directions between the inside and the outside. Furthermore, they must even be gas-tight, at least in certain cases. Threaded joints are particularly advantageous in this respect.

However, it is currently intended to subject the tubes in situ to diametric expansion with permanent plastic deformation. This has various advantages, which will be referred to below. Again it is necessary that the joints remain operational after the plastic deformation due to diametric expansion to which they are subjected like the tubes. Thus it is desirable that the threaded joints hold after plastic diametric expansion whilst substantially retaining the features for which they are valued, in particular mechanical strength under tension/compression, with or without internal or external high pressure, as well as sealing-tightness. A joint remains sealing-tight at liquid and/or gas pressures which are even greater if the contact pressure between the parts of the joint is strong over a good width and over the entire periphery of the surfaces in contact.

Conventional joints are not entirely satisfactory: either they do not meet these requirements, or they meet them in a random manner, or they meet them but not repeatedly.

In WO 02/01102, a joint structure is proposed intended to withstand plastic diametric expansion. In FR 02 00055, the Applicant has likewise proposed an improved joint structure to withstand plastic diametric expansion.

The present invention has just improved the situation and more particularly the sealing-tightness of the threaded joint.

The invention relates to a high-performance threaded tubular joint comprising a first, male tubular element and a second, female tubular element capable of being made up by the screwing together of respective mating threads. One at least of the first and second tubular elements has a non-threaded lip extending between its thread and its free end and having a sealing surface capable of being in sealing-tight contact with the opposite surface of the other element after screwing together and diametric expansion, followed by the generation of springback forces of the first and second tubular elements.

According to a main feature, the tubular joint has a tubular sleeve capable of being threaded over the second element before screwing, of being positioned so as to extend axially substantially opposite the lip and, after diametric expansion, of generating a springback force which is added to that of the second element to counteract the springback force of the first element, thus effecting at least the shrink-fitting of the tubular sleeve over the second element.

According to an advantageous embodiment, the non-threaded lip of the first element has a tongue at its end capable of engaging in abutment in a corresponding groove of the second element after screwing together and before expansion. The non-threaded lip is also capable of being held by the tongue in the groove during diametric expansion.

Advantageously, the sealing surface of the lip and the opposite surface are cylindrical and are disposed with slight clearance from one another after screwing and before diametric expansion.

According to another embodiment, the sealing face of the lip and the opposite face are capable of interfering radially with one another after screwing together and before diametric expansion.

According to a first modified embodiment, each of the first and second tubular elements comprises a non-threaded lip extending between its thread and its free end and having a sealing surface capable of being in sealing-tight contact with the opposite surface of the other element after screwing together and diametric expansion followed by the generation of springback forces of the first and second tubular elements. In this embodiment, the tubular joint comprises two tubular sleeves capable of being threaded over the second element before screwing together, of being positioned so as to extend axially substantially opposite to the lips respectively, and of generating a springback force which is added to that of the second element to counteract the springback force of the first element, thus effecting at least the shrink-fitting of the tubular sleeve over the second element.

In a second modified embodiment, the two sleeves are connected together by a brace having a cross-section smaller than that of the sleeves, the sleeves and the brace being formed in one piece.

Advantageously, the tubular brace has a radial thickness less than that of the sleeves.

According to one embodiment of the invention, each tubular sleeve has an overlap length roughly equal to the length of the opposite lip optionally with the addition of a length corresponding to at most 8 times the pitch of the threads.

Advantageously, each sleeve is centred over the opposite lip.

In an advantageous embodiment, the tubular sleeve extending opposite to the lip of the second element has a radial projection capable of coming into contact with a radial surface located at the end of the second element and capable of facilitating positioning of the tubular sleeve.

Preferably, the tubular sleeve is kept in position relative to the second element by adhesion of at least part of the surfaces of the second element and of the opposite sleeve.

The tubular sleeve is positioned axially on the second element by means of shrink-fitting at least by cooling of the second element and/or heating of the tubular sleeve.

In order to facilitate positioning of the tubular sleeve, the second element has a mark located on its outer peripheral face. In a possible embodiment, the mark is a shallow groove formed on the second element.

Preferably, the radial thickness of the tubular sleeve is at least equal to 1.5 mm.

The material of the tubular sleeve has a yield strength higher than the yield strength limit of the material of the first and second elements. Moreover, the yield strength of the tubular sleeve is adjusted by heat treatment.

The invention also relates to a method of producing a sealing-tight tubular threaded joint, starting from a tubular threaded joint known as an "initial tubular threaded joint". This initial threaded joint is subjected to diametric expansion in the region of plastic deformation by means of an expansion ball of a diameter greater than the inner diameter of the tubular elements, which is moved axially in the threaded joint in the region where each sleeve generates, after expansion, a springback force which is added to that of the second element in the region overlapped by the sleeve.

The invention also relates to a high-performance sealing-tight tubular joint, such as can be obtained by the method according to the invention, comprising a first, male tubular element and a second, female tubular element made up by the screwing together of respective mating threads. One at least of the first and second tubular elements has a non-threaded lip extending between its thread and its free end and having a sealing surface in sealing-tight contact with the opposite surface of the other element. The joint furthermore has a tubular sleeve tightly surrounding the second element and extending axially substantially opposite to the said lip.

BRIEF DESCRIPTION OF THE SEVERAL VIEWS OF THE DRAWINGS

The Figures below show in a non-limiting manner, embodiments of the invention:

FIGS. 4 to 7 show the threaded joint of the type to which the invention relates at various stages of the expansion process.

The drawings contain essentially elements of a certain character. They may therefore not only aid understanding of the description, but also contribute to the definition of the invention if necessary.

Annexe I shows the results of a comparative study of the sealing-tightness of a reference joint and threaded joints according to the invention.

We refer here to the drilling of wells for hydrocarbons or geothermics.

Conventionally, the top of a well is first drilled to a relatively small depth of several tens of metres by means of a large-diameter tool, for example of about 500 mm wide, and is lined with a string of tubes of this diameter. The drilling diameter then decreases by steps until the bottom of the well, which may be drilled with a substantially smaller diameter of about 150 mm in the same example. Such a well is then cased with plural strings of concentric tubes, each lowered at the end of drilling at the corresponding diameter and all suspended from the surface; the tubes of largest diameter extend from the surface to several tens of metres deep, and the tubes of the smallest diameter extend from the surface to the bottom of the well, whose depth may reach several thousand metres. The space between the casings and the earth is filled with cement for example.

After the well has been completely drilled and lined, a string of tubings can be lowered in order to allow in particular the rising of hydrocarbons to the surface, i.e. actual working of the well. Obviously this string of tubings has an outer diameter which is slightly smaller than the inner diameter of the string of casings.

To equip a well therefore leads to the installation of a large number of tubes of various dimensions, usually connected by means of threaded joints taking into account the advantages of this type of connection. It is desired to make these tubes as slim as possible in order to avoid too large diameters of casings near the surface. In fact keeping within the requirements and specifications applicable to threaded joints often leads to their having a larger thickness than that of the current part of the tubes, and this makes it imperative to increase the diametric progression between concentric strings when descending deep down into the well.

The connecting together of tubes is effected either by screwing the threaded ends of the tubes into one another (known as integral joints), or by means of threaded couplings covering their ends. The tubes are lowered consecutively after being screwed into the end of the preceding tube or coupling.

The specification API 5 CT of the American Petroleum Institute (API) thus defines tubular threaded joints between two large-length tubes ("integral-joint tubing", "extreme-line casing"), as well as coupled threaded connections comprising two threaded joints for assembling two large-length tubes by means of a coupling. These API joints are only made sealing-tight by the application of a grease charged with metal particles, which fills the gaps between threads.

Obviously the links between tubes (or between tubes and couplings) must remain sealing-tight whatever the loads to which the tubes are subjected during their descent into the well, and within a wide range of weight supported, since each joint supports at least in part the tubes located above itself. Furthermore, the mechanical performance of the threaded joints seem to be closely linked to their geometric characteristics.

A threaded joint is first defined by an "efficiency" under tension, determined by the ratio between the cross-section of the tube at the thread and the cross-section of the tube along its length.

Furthermore, when the pressure of the internal or external fluid exerted on the tubes becomes excessive, the threads may disengage, especially where the threadings have rounded triangular threads. This is why it is generally preferred to implement trapezoidal threads.

This being the case, whatever the type of thread used, there is always, in spite of the use of grease charged with particles, a leak channel into which a fluid under high pressure can circulate due to the play between the non-contacting surfaces. For a tensile load, there is a fluid pressure threshold beyond which the combined tension and pressure load causes the API threaded joints to disengage or jump out at the contacting threads of the male and female parts.

Threaded joints and connections have to this end been the subject of various improvements: for example, the patents FR 1489013, EP 0488912, and U.S. Pat. No. 4,494,777 have aimed to create what are known as superior or 'premium' tubular threaded joints which are particularly sealing-tight by virtue of metal-to-metal sealing bearing surfaces and of judiciously disposed stops between male and female elements.

This can be effected by two tapering sealing surfaces in interfering contact, the male sealing surface being disposed outwardly beyond the male thread and the female sealing surface being disposed correspondingly over the female element. Transversely located stop surfaces are used in cooperation to position the sealing surfaces and to increase their efficiency.

As indicated, after lowering of a tubular string into a well, it is intended to subject this to diametric expansion with permanent plastic deformation. This is effected for example by means of a ball which is forced to pass inside the string: see patents or patent applications WO 93/25799, WO 98/00626, WO 99/06670, WO 99/35368, WO 00/61915, GB 2344606, GB 2348657. This offers the following advantages:

lowering a string of low bulk, which is then forcibly expanded;

thus installing a string of casings, in the same manner, sealing in situ the holes of a casing or tubing pierced by corrosion or friction with the drilling rods, or even of lowering into the well low-bulk tubes which will be expanded to the desired diameter once in place, finally and above all, permitting the drilling of well bores of a uniform diameter over their entire length, whose casing is realised by a string of tubes all of the same diameter, the tubes being inserted in the non-expanded state, then being expanded in situ to the diameter of the well bore.

It would therefore be possible to substantially decrease the number of tubes necessary to equip a well by eliminating the larger-diameter tubes having a greater thickness. The cost of the well is consequently reduced. It is even conceivable to drill the well directly with the string of casings, which would act as a guide for the drilling rods.

It has been found that realising threaded joints which retain their performance after this expansion is extremely difficult, especially as this must be reliable (all the joints must hold) and stable in operating conditions.

It has been found that the conventional tubular threaded joints such as those according to the patent U.S. Pat. No. 4,494,777 do not withstand plastic diametric expansion. After expansion on these joints, the following is found:

an absence of sealing-tightness (which in addition makes it impossible to effect expansion by pushing the ball hydraulically through the string);

a deflection of the male end towards the inside of the joint inducing an internal projection into the space defined by the inner functional diameter, which considerably reduces in an unacceptable manner the inner functional diameter of the string;

possible rupture of the lip of the male end by exceeding the capacity for deformation of certain regions which are particularly stressed due to the variations in thickness along the length of male and female elements relative to the thickness in the body of the tube.

It has therefore been tried to form a tubular threaded joint which is capable of withstanding the expansion operation in the well and which is sealing-tight to liquids and to gases after the expansion operation. It has also been tried to make the tubular threaded joint simple and economical to produce. It has further been tried to give the threaded joint excellent metallurgical properties during operation therefore after expansion, in particular in that it has in this state a sufficient yield strength that it is free of brittleness and that it has good resistance to sulphide stress cracking.

Threaded joints are known having a male lip corresponding to a female housing (U.S. Pat. Nos. 4,611,838, 3,870,351, WO 99/08034, U.S. Pat. No. 6,047,997). It has been found that these known assemblies have no sealing-tightness after plastic expansion, but in any case this is in no way intended.

In U.S. Pat. No. 4,611,838, the male lip has a male end annular surface having an annular tooth; a female shoulder annular surface comprising an annular groove is provided. For abutment, the male lip has a toroidal outer peripheral surface and the female housing has a conical inner peripheral surface. These peripheral surfaces interfere radially at the end of screwing together in order to form sealing areas. U.S. Pat. No. 4,611,838 aims to maximise the radial interference of the toroidal outer peripheral surface of the male lip with the conical inner peripheral surface of the female housing at the end of screwing together (and thereby sealing-tightness of the threaded joint) by virtue of the shape of these peripheral surfaces and the supporting effect of the lower surface of the groove to the lower surface of the tooth. But the male end surface according to U.S. Pat. No. 4,611,838 is not well held in position in the end surface of the female shoulder of the threaded joint and therefore does not permit the transmission of a bending moment to the free end of the male lip due to the free space between the upper wall of the tongue at the free end thereof and the upper wall of the groove at the bottom thereof. Sealing-tightness after expansion cannot therefore be guaranteed.

U.S. Pat. No. 3,870,351 has a configuration of the male lip and end and of the female housing close to the configuration of the patent U.S. Pat. No. 4,611,838, the male free end surface being convexly curved and bearing on a concavely curved female shoulder surface so as to form two sets of metal-to-metal sealing surfaces, one at the curved surfaces, the other set being disposed on the outer peripheral surface of the male lip and on the inner peripheral surface of the female housing. Such a configuration makes it possible to increase the radial interference between the peripheral sealing areas on the screwed joint, which is not however sufficient for the application under consideration (sealing-tightness after expansion).

WO 99/08034 describes a threaded joint with square turns having a male lip corresponding to a female housing and having male end annular surfaces and female shoulder annular surfaces in the form of abutting rebates fitting one in another. The outer peripheral surface of the male lip and the inner peripheral surface of the female housing have cylindrical parts which interfere radially with one another in order to form a set of peripheral sealing areas at the end of screwing together when the male and female rebates are fitted together. The configuration of these surfaces is complex and expensive to realise, and gives no guarantee of sealing-tightness after plastic expansion. Furthermore, the trapping of grease may lead to poor positioning of the threaded elements.

Finally, U.S. Pat. No. 6,047,997 describes a structure of drilling rods for underground pipes for which there is no particular demand for sealing-tightness. The male end face according to this patent is rebated in a female shoulder face, but the figures show a considerable gap between the outer peripheral surface of the male lip and the inner peripheral surface of the female housing. This is not satisfactory either for the application under consideration.

In the connecting technique by expansion, each tube is placed end-to-end with the tubes already assembled after passing through the tubes preceding it. In order to allow the tube to pass through, the diameter of each tube already assembled will have undergone expansion of about 10 to 25%, starting with the first tube, by the passage of a ball of generally conical shape pulled from the surface of the well. This expansion of the tubes also makes it possible to improve sealing-tightness at the contacting surfaces of the joints.

An embodiment of a metal-to-metal sealing joint in the form of a finger adapted to this technology is disclosed in WO 02/01102 cited above. Another embodiment is shown in the not-yet-published French Patent FR 02 00055 cited above. Each of these embodiments describes a sealing-tight joint capable of being expanded and, once expanded, having sealing regions which ensure sealing-tightness to liquids, and even gas.

A sealing region is formed of two surfaces in contact subjected to contact pressures. One sealing region remains sealing-tight to liquid pressures, or gas pressures, which are even greater the since the contact pressure on these surfaces is strong. Moreover, the dimensions of these sealing surfaces (width and length) also have an effect on sealing-tightness. The invention proposes to improve the sealing-tightness of these joints at liquid and gas pressures in particular by increasing the contact pressure level with the sealing regions.

DETAILED DESCRIPTION OF THE INVENTION

Figure 1:
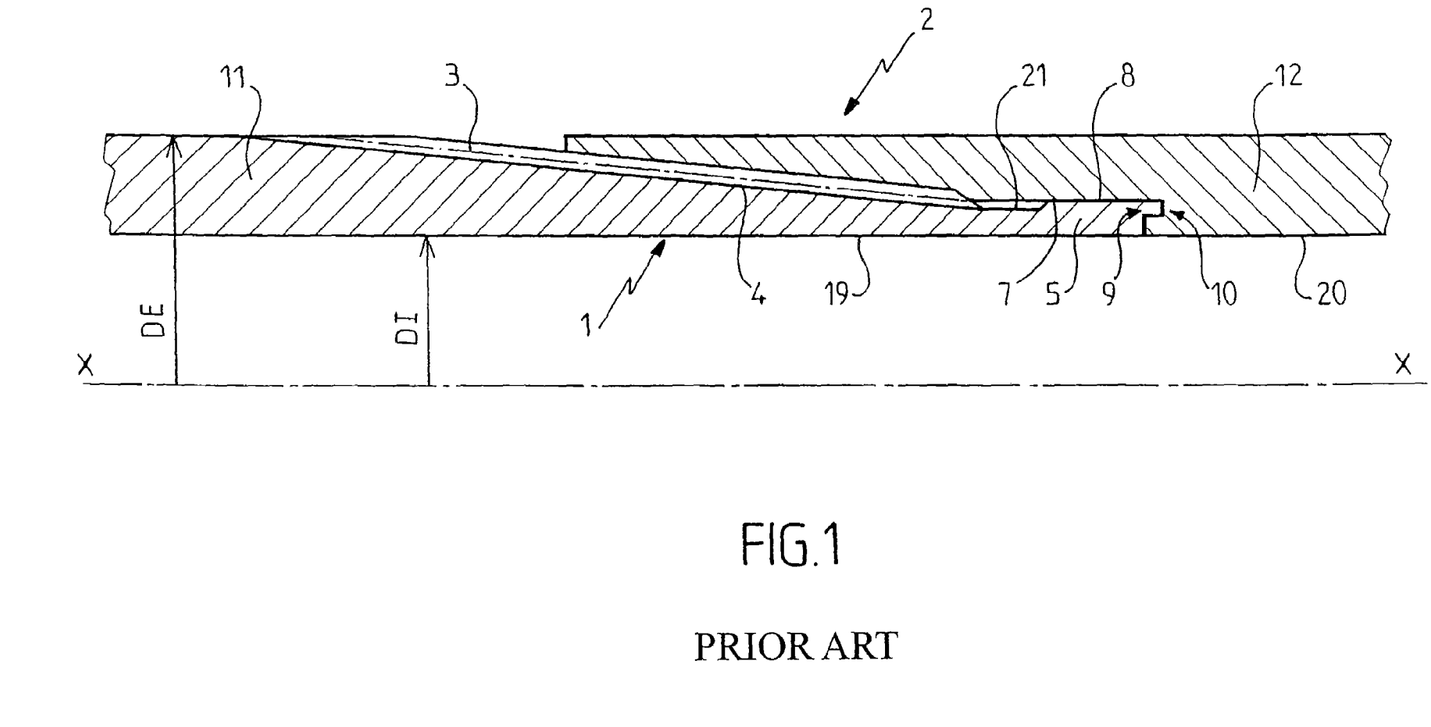
FIG. 1 shows a threaded joint of the type to which the invention relates.

FIG. 1 shows a joint comprising a male threaded element 1 disposed at the end of a first tube 11. This male element is screwed in abutment into a threaded female element 2 disposed at the end of a second tube. The inner diameter of the male threaded element is in this case equal to the inner diameter DI of the tubes 11, 12. In the embodiment in FIG. 1, the outer diameter of the female threaded element is equal to the outer diameter DE of the tubes 11, 12 only by way of example.

The joint in FIG. 1 is shown in the state of being simply screwed into abutment before any diametric expansion operation.

The second tube 12 as shown is a great-length tube. This second tube could be, in a manner not shown, a coupling equipped on one side with the female element 2 and on the other side with a second female element which may or may not be symmetrical to the latter and which is screwed to a male element located at the end of another great-length tube.

Figure 2:
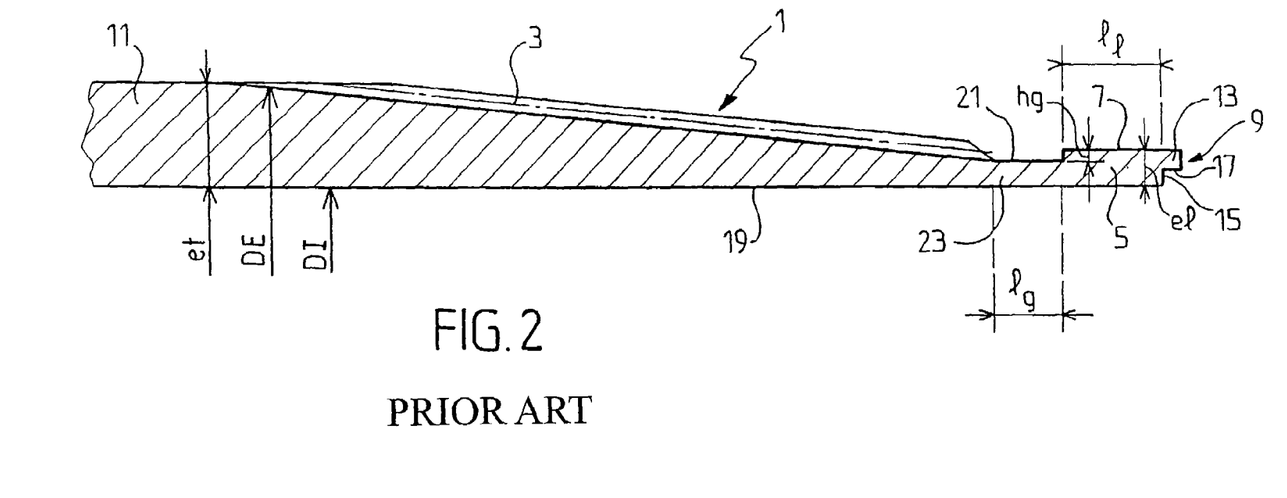
FIG. 2, the male element of the threaded joint of FIG. 1.

Only the male element 1 is shown in FIG. 2.

It comprises a male thread 3, which is tapered with trapezoid thread and extends to its free end by a non-threaded end part formed by a groove 21 and by a lip 5 and ends with an annular male end surface 9.

The groove 21 has a shallow U-shape.

It starts immediately beyond the thread and its depth $h_g$ is smaller than the height of the thread 3. Thus the bottom of the groove meets the root of the first thread.

The width of the groove $I_g$ is substantially equal to 4 times its depth $h_g$.

The lip 5 has:
a) an outer peripheral surface 7 of cylindrical form,
b) an inner peripheral surface 19 which corresponds to the end region of the cylindrical inner peripheral surface of the first tube 11.

The lip 5 therefore has a uniform thickness $e_l$ substantially equal to half the thickness $e_t$ of the tube 11. It has a length $l_t$ measured from the end of the groove to the perpendicular of the surface 15 (defined below) substantially equal to 3 times the lip thickness $e_l$.

The male end surface 9 forms a rebate. This rebate is formed of a male annular transverse surface 15 and an annular tongue 13 projecting axially, adjacent to the transverse surface 15. The male transverse surface 15 is located on the side of the rebate oriented towards the interior of the threaded joint.

The outer peripheral surface of the tongue 13 is an extension of the face 7 of the lip, whereas its inner peripheral surface 17 is cylindrical for example.

The radial thickness of the tongue 13 is substantially identical to that of the transverse surface 15, whereas the height of the tongue (or axial projection thereof) is substantially equal to the radial thickness of the tongue. It may also be equal to 1.5 times this radial thickness in order better to retain the free end of the tongue during expansion.

Figure 3:
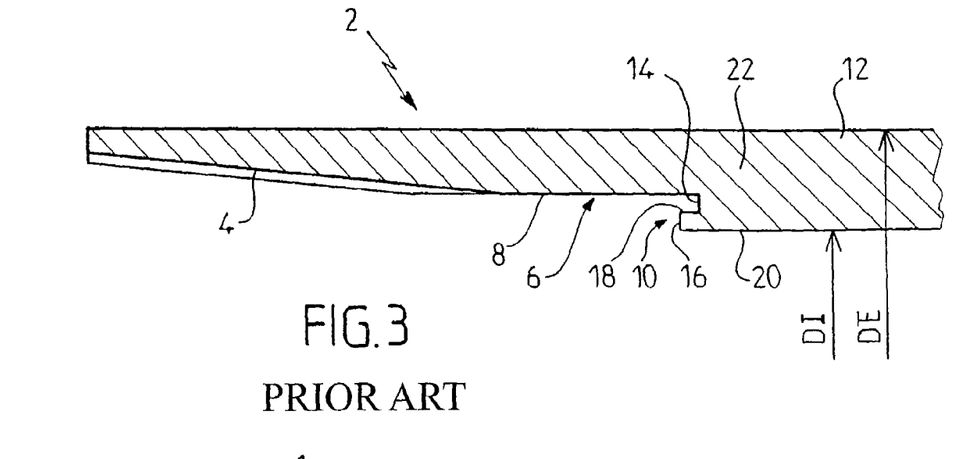
FIG. 3, the female element of the threaded joint of FIG. 1.

The female element 2 is shown alone in FIG. 3.

It comprises, from the free end of the female element, a female thread 4 with trapezoidal threads homologous to the male thread 3, then a non-threaded part 6. This non-threaded part 6 forms a housing to correspond with and cooperate with the lip 5 of the male element 1.

The female housing 6 has a peripheral surface 8 turned inwards, of cylindrical shape, connected on one side to the female thread 4 and on the other side via a female shoulder 10 to the inner cylindrical peripheral surface 20 of the second tube 12.

In general, the diameter of the peripheral surface 8 of the housing is very slightly larger than the diameter of the outer peripheral surface 7 of the male lip 5. Thus the faces 7 and 8 can slide into one another with little clearance during screwing of the male element into the female element, e.g. with a clearance of 0.2 mm. The advantage of such sliding will be explained below.

The female shoulder has an annular shoulder face 10 which is disposed substantially correspondingly and which has a shape substantially similar to that of the male end 9. The face 10 forms a rebate consisting of a female transverse annular surface 16 and an annular groove 14 adjacent to the transverse surface 16.

The female transverse surface 16 is located on the side of the rebate oriented to the interior of the threaded joint.

The wall 18 of the groove 14 adjacent to the transverse surface 16 is cylindrical for example and can join thereto by a chamfer or rounded edge. The opposite wall of the groove is an extension of the peripheral surface 8. During screwing together of the threaded joint, the surface 17 of the tongue 'rises' over the wall 18 of the groove until the free transverse end of the tongue extends against the bottom 24 of the groove 14. The axial height $h_r$ of the tongue 14 and the axial depth $P_r$ of the groove are such that the transverse surfaces 15 and 16 do not come into contact until after further screwing. The small clearance between the cylindrical surfaces 7 and 8 and between the surfaces of the tongue and the groove which are an extension of them therefore permits evacuation of the grease at the end of screwing and therefore correct positioning of the lip 5 relative to the housing 6.

FIGS. 4 to 7 illustrate the deformation phenomena produced when diametric expansion of about 15% is realised by means of a ball on the tubes connected by the threaded joints which have just been described and which ultimately permit a sealing-tight expanded joint.

Such deformation carried out on metal materials leads to plastic deformation of the metal.

Figure 4:
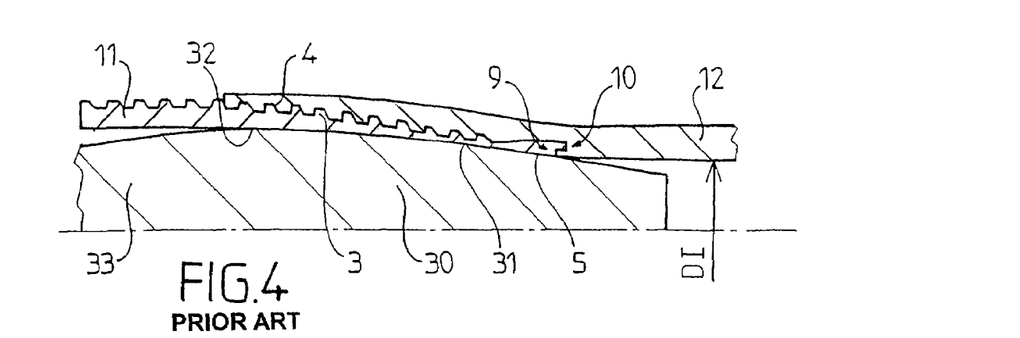
FIG. 4 shows the phase of expansion of the threaded joint, FIG. 5, the bending phase, FIG. 6, the straightening phase, FIG. 7, the final state of the threaded joint after undergoing the expansion process, FIG. 8, a threaded joint before expansion, having an embodiment of the sleeves according to the invention, FIG. 9, the threaded joint after expansion, having an embodiment of the sleeves according to the invention.

Thus for example one passes from an outer diameter of 139.7 mm (5.5 in) on the second tube 12 upstream of expansion, and consequently in the part not yet deformed, to an outer diameter of 157.5 mm (6.2 in) on the first tube 11 expanded (at the level of or downstream of the exit cone 33 of the ball). It is therefore imperative to use for the tubes a metal which allows such plastic deformation.

The plastic deformation generated increases the yield strength of the products: a tube having initially an elastic limit of 310 MPa (45 KSI) will have thus increased to 380 MPa (55 KSI) after deformation.

The diametric expansion is carried out in a known manner by means of a ball 30 (FIG. 4) of adequate maximum diameter. The ball is forced through the tubes either by pulling with the aid of drill rods or by pushing by hydraulic pressure, for example.

The ball has for example a biconical shape with an entry cone 31 on which the expansion is carried out, a middle cylindrical part 32 and an exit conical part 33. All the surfaces of the parts of the ball are joined together by adapted connection radii.

WO 93/25800 discloses in particular angles of entry cones especially adapted to the diametric expansion of tubes known as EST (expandable slotted tubing) for the working of hydrocarbon wells.

Since the tubes 11, 12 have a substantially constant cross-section, their ends do not create a particular problem during passage of the ball, provided that the capacity for deformation of the metal of which they are made is sufficient.

The process of expansion of the threaded joint can be broken down into 4 phases which are the subject of FIGS. 4 to 7.

Although the expansion operation can be carried out entirely in the reverse direction and lead to adequate results, the preferred mode of deformation has been shown in which the ball moves from the male element 1 of the first tube 11 to the female element 2 of the second tube 12.

a) Expansion Phase on the Ball Cone

FIG. 4 shows the threaded joint during this phase.

The expansion is carried out by the entry cone 31 of the ball 30 and FIG. 4 shows the male 3 and female threads 4 during diametric expansion.

In FIG. 4, the entry cone 31 of the ball 30 starts the deformation of the male lip and of the homologous female housing region by bending them in order to incline them relative to the axis of the connection.

During this expansion phase, the reaction loads to the passage of the ball 30 are progressively transferred from the first tube 11 to the second tube 12.

Due to these reaction loads, the male lip 5 is compressed axially during this expansion phase by the annular face of the female shoulder 10.

The end of the expansion phase corresponds to the arrival of the free end of the male element at the end of the entry cone 31 of the ball.

b) Bending Phase

Figure 5:
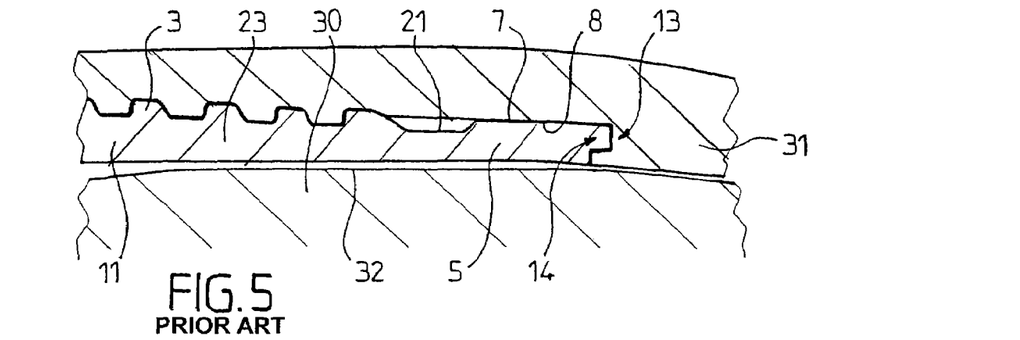

During this phase, the male lip is located level with the central part 32 of the ball: see FIG. 5.

i) Male Lip

The male lip 5 is subjected at both ends to bending moments in opposite directions.

The male end surface 9 is in fact kept in position in the female shoulder face 10 due to the rebates with bearing surfaces 15, 16 and to the embedding device of the tongue 13/groove 14.

The embedding of the rebates forces the free end region of the male lip 5 to follow the inclination of the region 22 of full thickness of the female element beyond the shoulder. This region 22 is again in the process of expansion on the entry cone 31 of the ball and therefore creates a bending moment at this level.

The other end of the lip, on the side of the male thread 3, is no longer supported and on the contrary imposes on the lip a bending moment opposite to that at the free end of the lip.

The bending moments of opposite sign at the two ends of the male lip bring about a banana-shaped curvature of the male lip 5, as in FIG. 5, whilst the outer peripheral surface 7 of the lip 5 takes on a curved convex shape.

The state of axial compression of the male lip 5 at the end of the phase of expansion facilitates its curvature under the effect of the bending moments.

The groove 21 located between the male lip 5 and the male thread 3 acts as a plastic pivot which accentuates the curvature of the male lip by limiting the width over which this curvature can take place.

It should be watched in this case, however, that the axial compression stresses on the male lip do not bring about buckling of the metal 23 under the groove. This buckling would be converted into a projection of the metal under the groove relative to the inner peripheral surface 19.

ii) Female Housing

The same bending phenomenon is produced on the female housing.

The region 22 of full thickness which is relatively rigid compared to the relatively slim regions of the lip undergoes additional expansion upon passage of the middle part, such that the inner diameter of the region 22 becomes larger than that of the middle zone 32 of the ball. The additional expansion phenomenon is described in the specification WO 93/25800.

c) Straightening Phase

Figure 6:
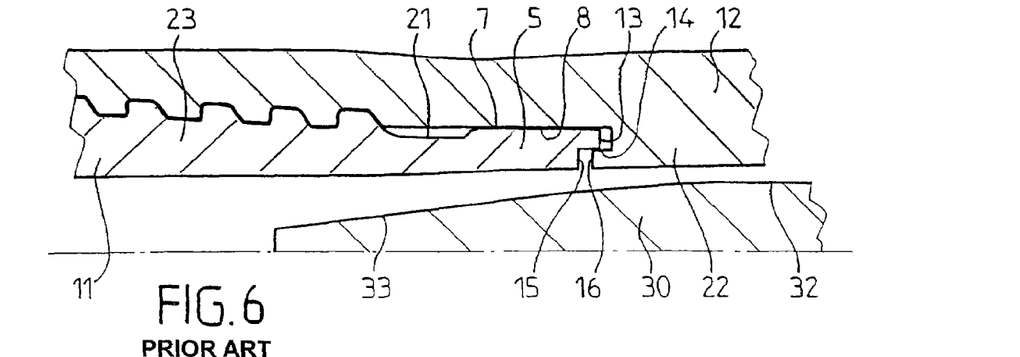

This phase illustrated in FIG. 6 corresponds to the passage of the female region 22 of full thickness over the middle part 32 of the ball 30.

i) Female Housing

The bending generated in the preceding phase tends to be brought back to zero under the effect of tension and circumferential stresses, which generates a state of inverse axial bending stresses relative to the curvature, thus bringing about straightening.

The bending moment generated by these stresses is proportional to the thickness of the material upstream of the straightening. At the moment of arriving on the tube 12 of full thickness (region 22), the bending moment is not sufficient to straighten the inner peripheral region of the female housing, which then tends to dive-towards the axis of the product. This behaviour is manifested by a local reduction of outer diameter of the tube 12.

ii) Male Lip

During the straightening of the female part, the difference in axial bulk which was generated by bending decreases. The male lip 5 therefore progressively loses the state in which it was under compression. This is followed by separation of the surfaces 15, 16 initially abutting. This phenomenon is reinforced by 'the diver' of the inner peripheral face 8 of the female housing which produces an effect of opening of the abutments 15, 16.

The banana-shaped deformation imposed in the preceding phase is conserved.

d) Final State

Figure 7:
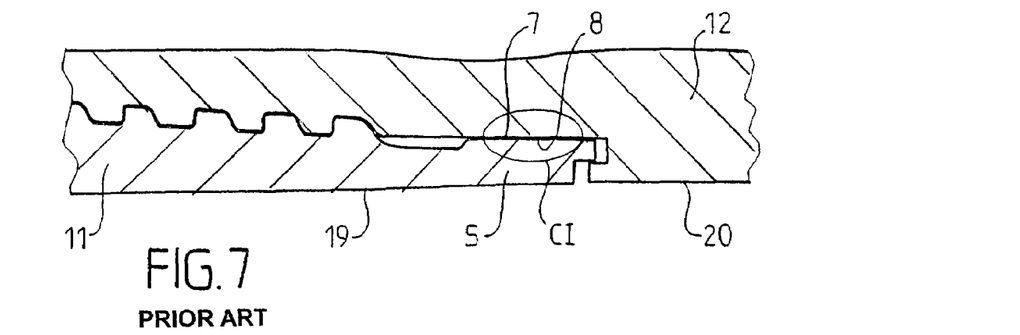

FIG. 7 shows the final state of the threaded joint after passage of the ball.

The state of hoop stresses generated by expansion leads to shrinking of the inner surface 8 of the female housing on to the outer peripheral surface 7 of the male lip. One can therefore refer to self-shrinking of the surfaces 7, 8 of the threaded joint in the expanded state, which ensures sealing-tightness. The male lip 5 does not dive towards the axis, as the radial offset imposed by the embedding of the rebates 9, 10 has generated sufficient plastic deformation.

The springback displacement of the elements of the threaded joint after passage of the ball is negligible compared to the plastic deformation brought about.

The radial shrink-fitting induces a contact pressure of several tens of MPa, even more than 100 MPa, sufficient to ensure sealing-tightness at the internal or external pressures at the threaded joint. The length of shrink-fitting is sufficient over the entire circumference of the contact surfaces to ensure stable sealing-tightness between these contact surfaces.

Sealing-tightness is further necessary when expansion is carried out by pushing the ball 30 hydraulically under a pressure of 10 to 30 MPa, and any leak at the joints that have already been expanded prevents the ball from penetrating further forward in the string and consequently blocking the process of expansion.

Too much clearance between the peripheral face 7 of the male lip 5 and the peripheral face 8 of the female housing on the threaded joint before expansion would not allow the shrink-fitting of these surfaces at the end of the expansion operation.

Radial interference between these surfaces in the initial state before expansion is liable to hinder the differential deformation (curvature, straightening) between these surfaces during expansion operations, which differential deformation makes it possible to effect shrink-fitting of these surfaces at the end of the expansion operation. It may also lead to galling of these surfaces during screwing together and poor positioning of the elements with incorrect embedding of the faces 9 and 10, and consequently to poor shrink-fitting of the surfaces 7 and 8 after expansion.

In a preferred embodiment, the form with an annular rebate with transverse surfaces 15, 16 and the tongue 13/groove 14 mechanism makes it possible to prevent diving of the male free end during expansion. Other embodiments of encased surfaces 9, 10 are possible in order to give the same result.

A too-small male lip 5 of thickness $e_l$ smaller than one third of the thickness $e_t$ of the tubes 11, 12 does not make for an effective abutment with the transverse surfaces 15, 16.

If the thickness $e_l$ of the male lip 5 is on the other hand larger than 2/3 of the thickness $e_t$ of the tubes 11, 12, the thickness of the tube 12 at the level of the female housing brings about a critical cross-section for the female thread 4 which is too weak and consequently offers insufficient resistance to tension of the threads.

The ratio of length/thickness of the male lip 5 dictates the behaviour under compression and bending of the lip 5.

A male lip 5 of length $l_l$ smaller than its thickness does not give sufficient bending of the peripheral surface 7 of the male lip 5 and/or straightening of the peripheral surface 8 of the female housing.

A male lip 5 of length $l_l$ larger than 4 times its thickness $e_l$ can cause buckling of the male lip and an internal projection thereof on the side of the thread.

This effect is accentuated by the presence of a groove 21 between the male thread 3 and the male lip 5.

This is why the groove preferably has a depth limited to thread height and a length which is limited relative to its depth.

A tongue 13 of insufficient radial thickness and axial height lower than the radial thickness could not be supported sufficiently during expansion.

Figure 8:
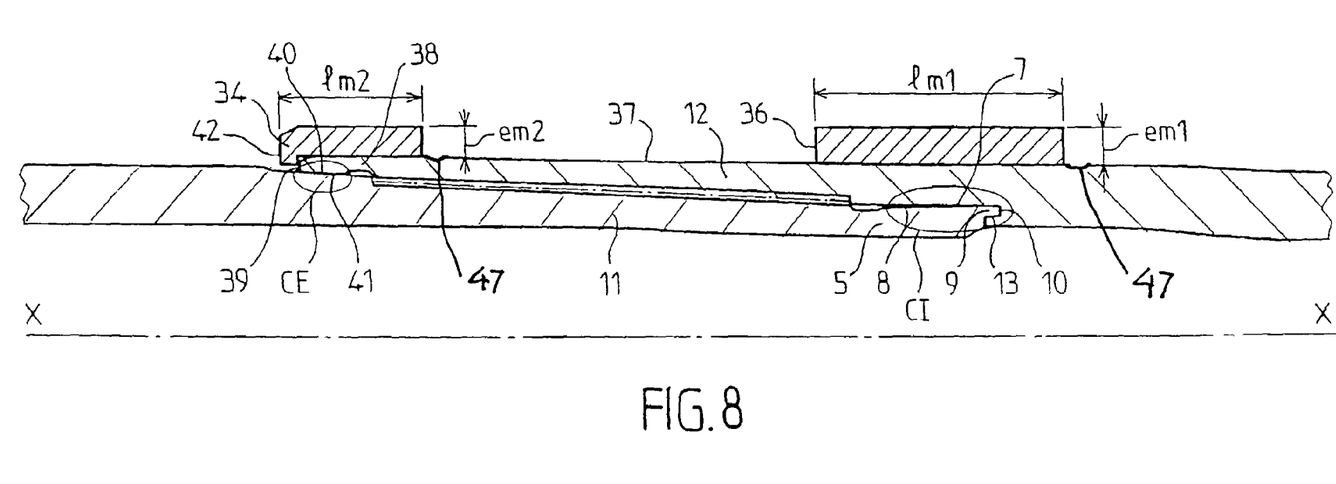
Figure 9:
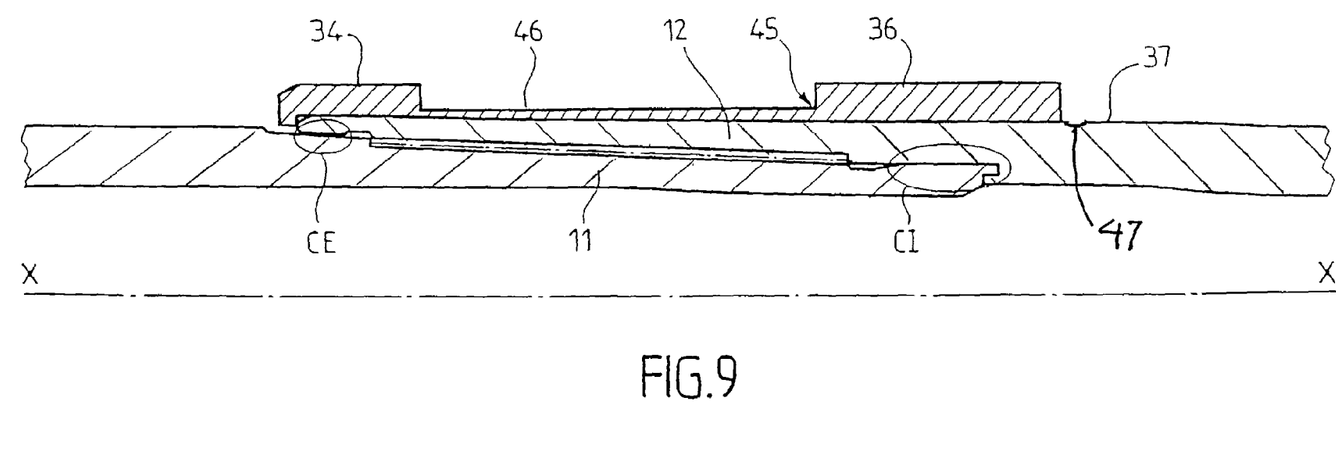

We refer now to FIG. 8, showing a tubular joint after screwing together of the partly threaded tubular elements, which joint is intended to be expanded diametrically according to the invention.

This joint has male 11 and female 12 tubular elements as shown in FIG. 1. The end part of the male tube has the lip 5, whose peripheral surface 8 is capable of coming into contact with the peripheral surface 7 of the female housing 8 of the female tube 12 upon expansion of the joint. The contact region with contact pressure between the surfaces 7 and 8 after expansion is known as the inner sealing region CI, as it is located towards the interior of the joint. After expansion, there is also a contact region between a surface of the tongue of the male lip and an opposite surface of the groove of the female tubular element.

A tubular sleeve 36 is disposed concentrically to the female tubular element 12. This tubular sleeve 36 has an inner diameter such that it allows this tubular sleeve to be threaded by an operator, before screwing of the tubular elements 11 and 12, on to the female tubular element 12 and to be in contact with the outer surface 37 of the tubular element 12. This tubular sleeve extends over all its length lm1 in order to overlap the lip 5 axially and to extend beyond the lip 5 on either side, i.e. on the side of the thread and beyond the tongue 13. The tubular sleeve 36 is advantageously centred on the lip.

At the end of screwing together and before expansion, the tongue 13 is axially abutting against the bottom of the groove 14 and the sealing surfaces 7 and 8 are cylindrical and disposed with slight clearance from one another at the end of screwing together. The lip 5 is held during expansion by the embedding device of the tongue 13 and groove 14.

In the example, the tubular sleeve 36 is formed of material identical to that of the tubular elements whose yield strength is for example identical to the yield strength of the material of these tubular elements. After diametric expansion, the tubular sleeve generates a resilient springback force, which is added to that of the female element and counteracts the springback force of the male element. The shrink-fitting of the tubular sleeve over the female element is thus effected. Moreover the difference of springback force between the male element on the one hand and the assembly consisting of the sleeve and female element on the other brings about compression of the female element. As the tubular sleeve 36 overlaps the surfaces 7 and 8 and slightly beyond, the compression is translated into an increase in contact pressure between the sealing faces 7 and 8 of the male and female elements. The shrink-fitting of the female element over the male element is thus effected. The presence of the tubular sleeve 36 requires an expansion energy scarcely larger than when there is no tubular sleeve (of about 10%) and considerably reinforces the contact pressure at the inner sealing region CI after expansion (of about 200% for a sleeve of a thickness of 4 to 5 mm).

In the embodiment shown, before expansion, the tubular sleeve 36 is defined by
- a length of overlap lm1 roughly equal to at least the length of the lip 1 with the addition of a length of about 2 to 8 times at most the width of a turn of the thread,
- a radial thickness em1 limited between a maximum radial thickness specified by the maximum bulk of the joint and a minimum radial thickness specified by too weak an effect of the sleeve on the springback force of the threaded elements: advantageously, the radial thickness is about a few millimetres, e.g. at least 1.5 mm and preferably about 4 to 5 mm for tubes of an outer diameter of 150 mm and a thickness of 7 to 8 mm. The preferred thickness of the sleeve is substantially close to that of the male lip. After expansion the radial thickness is at least equal to 1 mm.

In one embodiment of the invention, the surfaces 7 and 8 define what is known as the inner sealing region CI of the joint after diametric expansion. However, another sealing region is formed before and after diametric expansion of the sealing-tight joint shown in FIG. 8.

Thus the female tubular element 12 has, between its thread and its free end, a non-threaded female lip 38. This female lip 38 has an inner peripheral face 41 ending with a radial surface 39 forming an annular surface. The male tubular element 11 has an outer peripheral surface 40 on the side of the male thread opposite to its free end. After screwing together fully the male and female tubular elements, the inner peripheral surface 41 interferes radially with the outer peripheral face 40 of the male tubular element 11 so as to define a sealing-tight region before expansion. The surfaces 40 and 41 are both conical and of similar conicity. During expansion, the female lip not in axial abutment against the male element, there are no signs of bending or counter-bending as in the case of the male lip in axial abutment against the female element. Thus the female lip does not dive towards the axis. After expansion, there happens just a springback replacement of the lip 38 which is slightly greater than that of the subjacent male element. This brings about sealing-tight contact between the inner peripheral surface 41 of the female lip and the corresponding peripheral surface 40 of the male tubular element 11. The interference of the surfaces 40 and 41 after screwing together ensures contact between these surfaces upon springback at the end of after expansion.

The sealing-tight contact region between the surfaces 40 and 41 after expansion is known as the outer sealing-tight region CE, since it is located towards the outside of the joint.

Apart from any other means, the external sealing-tightness created at the region CE is however less than that created at the region CI.

A tubular sleeve 34 is disposed concentrically to the female tubular element 12. This tubular sleeve 34 has an inner diameter such that it allows the tubular sleeve to be threaded on by an operator before screwing of the tubular elements 11 and 12 on to the female tubular element 12 and to be in contact with the outer surface 37 of the tubular element 12. This second tubular sleeve extends over its entire length lm2 in order to overlap axially the peripheral surfaces 40 and 41 capable of defining the sealing-tight region before and after expansion and to extend beyond these faces on either side, i.e. on the side of the thread and beyond the radial surface 39. In the example, the tubular sleeve 34 is formed from a material similar to that of the tubular elements and whose yield strength is for example equal to the yield strength of the material of these tubular elements. After diametric expansion, the tubular sleeve generates a springback force which is added to that of the female element in order to counteract the resilient restoring force of the male element. The shrink-fitting of the tubular sleeve over the female element is thus effected. Moreover, the difference in springback between the sleeve and the inner surface of the male element brings about compression of the female element. As the tubular sleeve 34 overlaps the surfaces 40 and 41 and slightly beyond, compression is translated into an increase in the contact pressure between the sealing surfaces 40 and 41 of the male and female elements relative to a similar joint without a sleeve 34. The shrink-fitting of the female element over the male element is also effected. The presence of the tubular sleeve 34 requires an expansion energy scarcely any greater than without a tubular sleeve and considerably increases the contact pressure at the outer sealing-tight region CE after expansion (of more than about 300%).

In the embodiment shown, before expansion, the tubular sleeve 34 is defined by

- a length of overlap lm2 roughly equal to the axial length of the female lip 38 with the addition of a length of about 2 to 8 times at most the width of a thread,
- a thickness em2 limited between a maximum thickness specified by the maximum bulk of the joint and a minimum thickness specified by too weak an effect on the springback: advantageously, the thickness is about a few millimetres, e.g. at least 1.5 mm and preferably 4 to 5 mm for tubes with an outer diameter of about 150 mm and of a thickness of 7 to 8 mm. Here also, the thickness of the sleeve 34 is preferably about the same size as that of the female lip. After expansion, the radial thickness is at least equal to 1 mm.

Whether for the sleeve 34 or the sleeve 36, it has been found that a short sleeve, discontinuous in material from the male and female threaded elements, would improve the sealing-tightness performance, in particular of external sealing-tightness, much more than a long added sleeve or than a simple extra thickness of the material on the female element instead of the sleeve or sleeves. Such a teaching would not appear to be absolutely obvious.

Various methods of mounting sleeves are conceivable.

In one embodiment, the tubular sleeve 34 has a radial projection 42 at one end. Thus, before screwing together of the tubular elements 11 and 12, an operator threads the tubular sleeve 34 on to the tubular elements 12 from the end opposite to that having the projection, the inner peripheral surface of the sleeve being in contact with the outer peripheral surface 37. The tubular sleeve 34 is threaded on until the radial projection 42 comes into contact with the radial surface 39. The tubular sleeve 34 is thus positioned axially. The radial projection 42 may advantageously be adhered to the radial surface 39 so as to improve the contact pressure. A "grease glue" can be used, which hardens in a few minutes in anaerobic conditions and makes it possible to hold the position of the tubular sleeve relative to the female element during expansion. The layer of glue can be sheared and cracked during expansion without posing a risk.

In a modified embodiment, the tubular sleeve 36 and/or 34 is (are) threaded over the tubular element 12 before screwing together by an operator, then positioned axially by means of the presence of marking on the outer peripheral surface 37 of the female tubular element 12, in which case the marking may be a shallow groove 47. The axial position of the tubular sleeve(s) 36 and/or 34 may be held by means of the "grease glue" as in the case of the sleeve with a radial projection. The axial position of the tubular sleeve(s) 36 and/or 34 may also be held by a very slight shrinking on to the female tubular element. The shrink-fitting may be effected by heating of the sleeve and/or cooling of the female element.

The radial thickness of a tubular sleeve may be decreased at the expense of decreased efficiency in the reinforcement of the sealing-tightness created by the sleeve. However, it is possible for thin sleeves to compensate somewhat for their loss of efficiency by increasing their yield strength relative to that of the male and female elements 11 and 12. The higher the yield strength of the sleeve compared to the yield strength of the male and female elements, the better the sealing-tightness at a given thickness. The yield strength of the tubular sleeve is capable of being modified by heat treatment. However, the ductility of the material is generally reduced by the increase in yield strength. A compromise can be found between ductility, which must be sufficient to generate diametric expansion without rupturing the tubular sleeve, and a yield strength sufficiently high to ensure sufficient sealing-tightness properties in spite of the restricted radial thickness of the tubular sleeve.

If a tubular element only has one outer CE or inner CI sealing-tight region, this sealing-tight region is capable of ensuring the sealing-tightness against fluids passing from the inside to the outside as well as from the outside to the inside. In this case, the terms "outer sealing-tight region" and "inner sealing-tight region" make it possible substantially to locate the sealing-tight region at the free end of the male or female tubular element.

In annexe I, the relative properties of threaded joints are shown as integrated contact pressure over the width of contact. This study aims to compare, relative to a simple reference threaded joint (case 1) the various embodiments according to the invention adapted to this simple threaded joint. The joint taken as a reference is a threaded joint with an outer diameter of 152.4 mm (6 inches) and a metric weight of 27.8 kg/m (18.6 lb/ft) in AISI 420 (13% Cr) steel according to the American standard (corresponds to the European standard X20Cr13) treated for the grade API L80 (API=American Petroleum Institute) corresponding to the minimum yield strength of 551 MPa.

The tables 1 and 2 relate respectively to the results of external and internal sealing-tightness as a percentage for each case considered compared to the internal sealing-tightness of the reference case:

case 1: reference threaded joint, case 2: reference threaded joint covered by a very long sleeve fixed to the male threaded element and overlapping the thread and the male and female lips, of thickness 4.5 mm, in steel identical to that of the threaded joint (13% Cr) and treated identically to the joint (API L80)

case 3: reference threaded joint equipped with two short sleeves according to the present invention (FIG. 8) of the same thickness, material and treatment as in the preceding case, case 4: the same as case 3, but having a single sleeve disposed at the level of the female lip, being very thin (thickness 1.6 mm) and adhered to the female element at the level of its radial projection, case 5: the same as case 4, but having a sleeve treated for a grade API P110 (corresponding to the elastic limit $R_{p\,0.2} \geq 758$ MPa).

In case 1, the internal sealing-tightness is excellent but the external sealing-tightness is weaker (44% of the internal sealing-tightness). A long sleeve (case 2) only improves the internal sealing-tightness. The use of two short sleeves (case 3) of similar thickness to case 2 improves both the external and internal sealing-tightness. By severely decreasing the thickness (case 4), it is possible to retain sufficient external sealing-tightness (only one studied). By increasing the grade of the sleeve, and therefore the yield strength (case 5), it is possible to increase the external sealing-tightness, which virtually reaches the level of sealing-tightness of the reference case.

The peak of effort (not shown here) generated by the presence of the sleeve for diametric expansion and the expansion energy is very limited.

For a tubular element having the two inner and outer sealing-tight regions, a modified embodiment of the tubular sleeve consists in a tubular overlapping piece 45 as shown in FIG. 11, comprising the sleeves 34 and 36 of FIG. 8 connected together by a tubular brace 46. This tubular brace 46 is of much smaller radial thickness than that of the sleeves 34 and 36 so as virtually not to oppose the diametric expansion force over the entire length of the brace 46.

The various methods of assembling this overlapping piece are the same as for the tubular sleeve 34 on its own.

The invention is not limited to the embodiments described by way of example.

The invention applies either to joints having only the internal sealing-tight region or the joints having only the external sealing-tight region, or joints having both sealing-tight regions. The invention can be adapted to joints having other sealing-tight regions such as intermediate sealing-tight regions for example.

Annexe I

TABLE 1

|  | Case number | | | | |
| --- | --- | --- | --- | --- | --- |
|  | 1 | 2 | 3 | 4 | 5 |
| External sealing-tightness (in % compared to internal sealing-tightness of case 1) | 44 | 45 | 158 | 89 | 99 |

TABLE 2

| Case number | 1 | 2 | 3 |
| --- | --- | --- | --- |
| Internal sealing-tightness (in % compared to internal sealing-tightness of case 1) | 100 | 220 | 201 |

The invention claimed is:

1. An expandable threaded tubular joint comprising:
a first tubular element and a second tubular element, the first and second tubular elements having respective mating threads, the first and second tubular elements having respective first and second non-threaded lips extending between their threads and respective free ends,
wherein each of the first and second non-threaded lips of the first and second tubular elements comprises a respective first and second sealing surface,
the tubular joint having a first state in which the first and second tubular elements are made up together by screwing together the mating threads, and
the tubular joint having a second state, derivable from the first state by a diametric expansion to a predetermined extent, in which second state each sealing surface comes in sealing-tight contact with an opposite surface of the other tubular element,
wherein the tubular joint has first and second tubular sleeves having an inner diameter fitting over the second tubular element before screwing together the first and second tubular elements, the first sleeve being positioned in order to extend axially substantially opposite to the first non-threaded lip and the second sleeve to be positioned in order to extend axially opposite to the second non-threaded lip, the fitting in the first state being such that the tubular sleeves effect at least shrink-fitting directly on the second tubular element in the second state, thereby generating, in the second state, a tubular sleeve springback force which cumulates with a springback force of the second tubular element for counteracting a springback force of the first tubular element, and
wherein the two sleeves are connected together by a brace, the sleeves and the brace being formed in one piece.

2. The tubular joint according to claim 1, wherein the non-threaded lip of the first tubular element has a tongue at the end to engage in an axial abutment in a corresponding groove of the second tubular element after screwing together and before expansion, the non-threaded lip to be held by the tongue in the groove during diametric expansion.

3. The tubular joint according to claim 1, wherein the second sealing surface and a respective opposite surface interfere radially one with another in the first state.

4. The tubular joint according to claim 1, wherein the first sealing surface and a respective opposite surface are disposed with a clearance fit from one another in the first state.

5. The tubular joint according to claim 4, wherein the first sealing surface and the opposite surface are cylindrical.

6. The tubular joint according to claim 1, wherein the brace is a tubular brace that has at least one of a radial thickness smaller than that of the sleeves and a cross-section smaller than that of the sleeves.

7. The tubular joint according to claim 1, wherein the second tubular sleeve has a radial projection that comes into contact with a radial surface disposed at the end of the second tubular element to facilitate positioning of the tubular sleeves.

8. The tubular joint according to claim 1, wherein tubular sleeves are positioned axially on the second tubular element by shrink-fitting at least by cooling of the second tubular element.

9. The tubular joint according to claim 1, wherein the tubular sleeves are positioned axially on the second tubular element by shrink-fitting at least by heating of the tubular sleeves.

10. The tubular joint according to claim 1, wherein the second tubular element has a mark which is disposed on an external peripheral surface and which is to facilitate positioning of the tubular sleeve.

11. The tubular joint according to claim 10, wherein the mark is a shallow groove formed in the second tubular element.

12. The tubular joint according to claim 1, wherein the tubular sleeve has a radial thickness of at least 1.5 mm.

13. The tubular joint according to claim 1, wherein the tubular sleeve is made of a material that has a yield strength higher than a yield strength of a material from which the first and second tubular elements are made.

14. The tubular joint according to claim 1, wherein the tubular sleeve is made of a material having a yield strength that is adjusted by heat treatment.

15. The tubular joint according to claim 1, wherein each tubular sleeve has an overlap length roughly equal to the length of the lip opposite.

16. The tubular joint according to claim 15, wherein each tubular sleeve has an overlap length roughly equal to the length of the lip opposite with the addition of at most 8 times a pitch of the threads.

17. The tubular joint according to claim 1, wherein each tubular sleeve is axially centered on the respective lip opposite.

18. An expandable threaded tubular joint comprising:
a first tubular element and a second tubular element, the first and second tubular elements having respective mating threads, at least one of the first and second tubular elements having a non-threaded lip which extends between its threads and a free end and is provided with a sealing surface, the tubular joint having a first state in which the first and second tubular elements are made up together by screwing together the mating threads, and the tubular joint having a second state, derivable from the first state by a diametric expansion to a predetermined extent, in which second state the sealing surface on at least one of the first and second tubular elements comes in sealing-tight contact with an opposite surface of the other one of the first and second tubular elements, wherein the tubular joint has a tubular sleeve fitting over the second tubular element in the first state of the joint so as to extend axially substantially opposite the non-threaded lip, the fitting in the first state being such that the tubular sleeve effects at least shrink-fitting over the second tubular element in the second state, thereby generating, in the second state, a tubular sleeve springback force which cumulates with a springback force of the second tubular element for counteracting a springback force of the first tubular element, whereby the tubular sleeve is held in position relative to the second tubular element by a glue to make at least part of the surface of the second tubular element adhere to at least part of the tubular sleeve surface.

19. The tubular joint according to claim 18, wherein the tubular sleeve has an overlap length roughly equal to the length of the lip opposite with the addition of at most 8 times a pitch of the threads.

20. The tubualr joint according to claim 18, wherein each tubular element has a respective non-threaded lip with a sealing surface, and each tubular element has a tubular sleeve, one tubular sleeve being positioned in order to extend axially substantially opposite to the first non-threaded lip of the first tubular element and the other tubular sleeve being the tubular sleeve that is positioned in order to extend axially substantially opposite to the second non-threaded lip of the second tubular element.

* * * * *